US012643541B2

(12) United States Patent　　　　　(10) Patent No.:　US 12,643,541 B2
Jun et al.　　　　　　　　　　　　　　(45) Date of Patent:　Jun. 2, 2026

(54) AUTONOMOUS DRIVING CONTROL APPARATUS AND METHOD

(71) Applicants:HYUNDAI MOTOR COMPANY, Seoul (KR); KIA CORPORATION, Seoul (KR)

(72) Inventors: Eun Ji Jun, Hwaseong-si (KR); Byeong Wook Jeon, Hwaseong-si (KR); Dong Hoon Jeong, Hwaseong-si (KR); Ki Sang Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 89 days.

(21) Appl. No.: 18/882,409

(22) Filed: Sep. 11, 2024

(65) Prior Publication Data

US 2025/0276688 A1　　Sep. 4, 2025

(51) Int. Cl.
| | |
|---|---|
| *B60W 30/14* | (2006.01) |
| *B60W 50/06* | (2006.01) |
| *B60W 50/10* | (2012.01) |
| *B60W 60/00* | (2020.01) |
| *G06N 3/0455* | (2023.01) |

(52) U.S. Cl.
CPC .......... *B60W 30/143* (2013.01); *B60W 50/06* (2013.01); *B60W 50/10* (2013.01); *B60W 60/001* (2020.02); *G06N 3/0455* (2023.01); *B60W 2540/30* (2013.01)

(58) Field of Classification Search
CPC .... B60W 30/143; B60W 50/06; B60W 50/10; B60W 60/001; B60W 2540/30; B60W 40/09; B60W 40/06; B60W 2520/10; G06N 3/0455; G06N 3/045; G06N 3/08
See application file for complete search history.

(56) References Cited

U.S. PATENT DOCUMENTS

2025/0140027 A1*　5/2025　Liu ...................... G06N 3/0455

* cited by examiner

*Primary Examiner* — Michael V Kerrigan
(74) *Attorney, Agent, or Firm* — Lempia Summerfield Katz LLC

(57)　　　　　　ABSTRACT

An autonomous driving control apparatus includes a memory and at least one processor. The at least one processor identifies first input information including at least one of a characteristic of a road, event information of the road, or any combination thereof and second input information including a characteristic of the vehicle. The at least one processor further performs cross-modal alignment of a backbone model for outputting a speed profile. The at least one processor also applies an output obtained by applying the first input information to a first encoder neural network, an output obtained by applying the second input information to a feature extraction neural network of the backbone model, and a target speed to a second decoder neural network. The at least one processor further obtains the speed profile from the second decoder neural network to perform main learning of the backbone model.

20 Claims, 10 Drawing Sheets

AUTONOMOUS DRIVING
CONTROL APPARATUS
100

PROCESSOR
110

MEMORY
120

INSTRUCTIONS
122

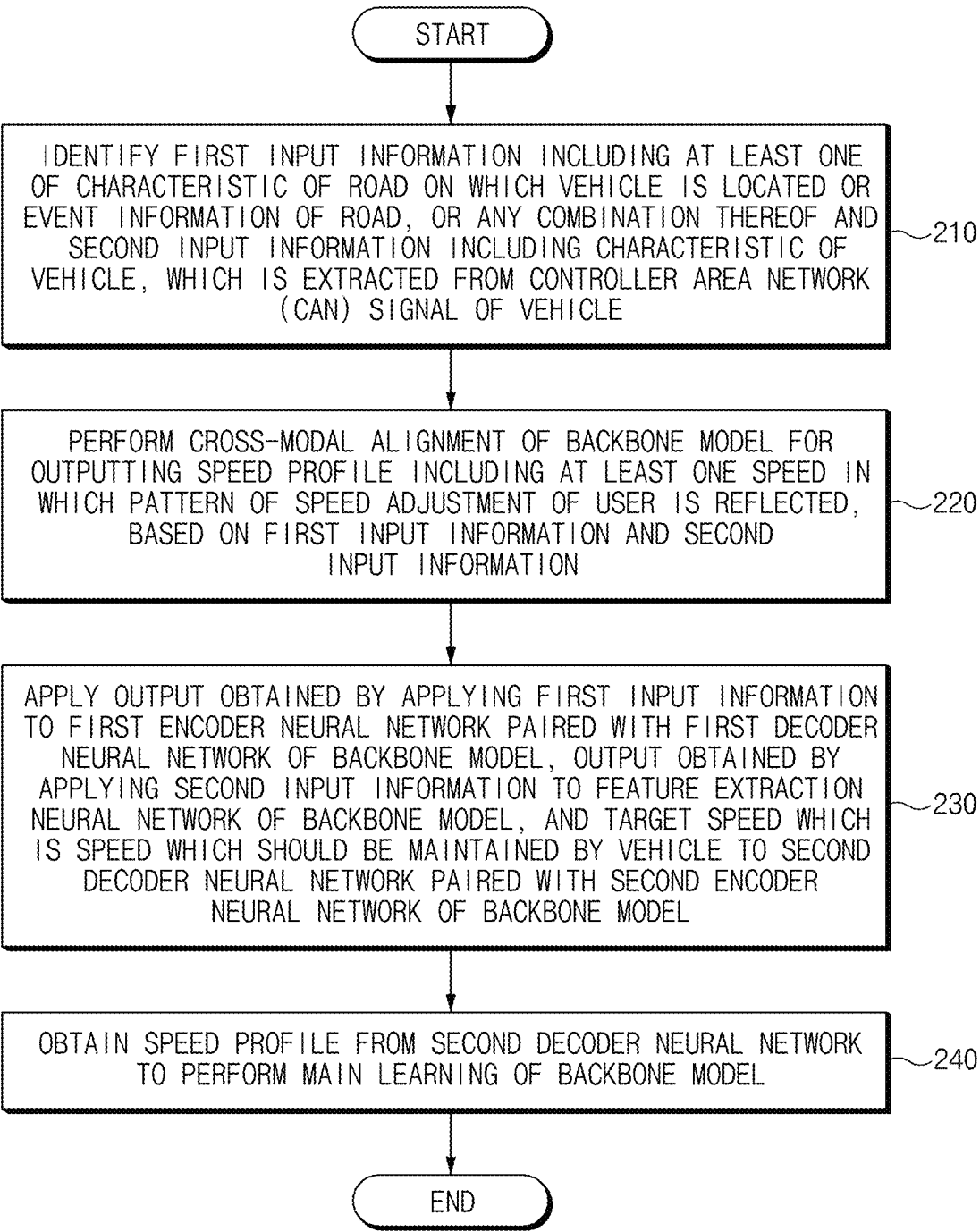

START

IDENTIFY FIRST INPUT INFORMATION INCLUDING AT LEAST ONE OF CHARACTERISTIC OF ROAD ON WHICH VEHICLE IS LOCATED OR EVENT INFORMATION OF ROAD, OR ANY COMBINATION THEREOF AND SECOND INPUT INFORMATION INCLUDING CHARACTERISTIC OF VEHICLE, WHICH IS EXTRACTED FROM CONTROLLER AREA NETWORK (CAN) SIGNAL OF VEHICLE ~210

PERFORM CROSS-MODAL ALIGNMENT OF BACKBONE MODEL FOR OUTPUTTING SPEED PROFILE INCLUDING AT LEAST ONE SPEED IN WHICH PATTERN OF SPEED ADJUSTMENT OF USER IS REFLECTED, BASED ON FIRST INPUT INFORMATION AND SECOND INPUT INFORMATION ~220

APPLY OUTPUT OBTAINED BY APPLYING FIRST INPUT INFORMATION TO FIRST ENCODER NEURAL NETWORK PAIRED WITH FIRST DECODER NEURAL NETWORK OF BACKBONE MODEL, OUTPUT OBTAINED BY APPLYING SECOND INPUT INFORMATION TO FEATURE EXTRACTION NEURAL NETWORK OF BACKBONE MODEL, AND TARGET SPEED WHICH IS SPEED WHICH SHOULD BE MAINTAINED BY VEHICLE TO SECOND DECODER NEURAL NETWORK PAIRED WITH SECOND ENCODER NEURAL NETWORK OF BACKBONE MODEL ~230

OBTAIN SPEED PROFILE FROM SECOND DECODER NEURAL NETWORK TO PERFORM MAIN LEARNING OF BACKBONE MODEL ~240

END

FIG.2

AUTONOMOUS DRIVING CONTROL APPARATUS AND METHOD

CROSS-REFERENCE TO RELATED APPLICATION

This application claims the benefit of and priority to Korean Patent Application No. 10-2024-0030824, filed on Mar. 4, 2024, the entire contents of which are incorporated herein by reference.

TECHNICAL FIELD

The present disclosure relates to an autonomous driving control apparatus and method, and more particularly, to technologies for generating a personalized driver acceleration and deceleration driving pattern in real time.

BACKGROUND

Recently, an autonomous driving control technology may perform an operation of predicting a future speed on average, in a predetermined prediction section, based on time series driving information collected in the past. Such a technology may not reflect features, such as driving habits for each driver of a vehicle, driving patterns for each driver, and driving schemes for each deriver, in the prediction operation. In detail, the autonomous driving control technology may have a limitation in limiting the driving pattern of the driver to a limited class classification and not considering various driving patterns for each driver. Furthermore, the autonomous driving control technology may have a limitation that it is impossible to predict a personalized future speed, for sensor data (e.g., driving observations) input in real time (e.g., based on sensor data input in real time) while the vehicle is traveling.

The statements in this Background section merely provide background information related to the present disclosure and may not constitute prior art.

SUMMARY

The present disclosure has been made to solve the above-mentioned problems occurring in the prior art while advantages achieved by the prior art are maintained intact.

An embodiment of the present disclosure provides an autonomous driving control apparatus and method for performing cross-modal alignment of a backbone model including an encoder neural network and a decoder neural network based on first input information which is information about a road and second input information about a vehicle to obtain a speed profile in which a speed adjustment pattern of a user is reflected from the backbone model for reflecting the distribution of the first input information and the distribution of the second input information.

In another embodiment of the present disclosure, an autonomous driving control apparatus and method may use only a first encoder neural network and a second decoder neural network in an operation of inferring the speed profile and thus reduce time complexity of the calculation process.

In another embodiment of the present disclosure, an autonomous driving control apparatus and method may use a fast inference speed and a neural network with a smaller number of parameters based on a first encoder neural network and a second decoder neural network to perform embedding in an embedded control system and additionally perform online learning on a device in which a backbone model is embedded to generate a personalized speed profile.

The technical problems to be solved by the present disclosure are not limited to the aforementioned problems, and any other technical problems not mentioned herein should be clearly understood from the following description by those having ordinary skill in the art to which the present disclosure pertains.

According to an embodiment of the present disclosure, an autonomous driving control apparatus may include a memory storing computer-executable instructions and at least one processor that accesses the memory and executes the instructions. The at least one processor may identify first input information including at least one of a characteristic of a road on which a vehicle is located, event information of the road, or any combination thereof and second input information including a characteristic of the vehicle. The characteristic of the vehicle may be extracted from a controller area network (CAN) signal of the vehicle. The at least one processor may also perform cross-modal alignment of a backbone model for outputting a speed profile including at least one speed in which a pattern of speed adjustment of a user is reflected, based on the first input information and the second input information. The at least one processor may further apply an output obtained by applying the first input information to a first encoder neural network paired with a first decoder neural network of the backbone model, an output obtained by applying the second input information to a feature extraction neural network of the backbone model, and a target speed which is a speed which should be maintained by the vehicle to a second decoder neural network paired with a second encoder neural network of the backbone model. The at least one processor may also obtain the speed profile from the second decoder neural network to perform main learning of the backbone model.

In an embodiment, the at least one processor may apply the first input information to an embedding layer of the backbone model to obtain an embedding matrix based on (e.g., following) a predetermined embedding dimension and a dimension of a value input to the embedding layer and may apply the embedding matrix and information about a position of each of values included in the embedding matrix to the first encoder neural network.

In an embodiment, the at least one processor may determine a driving pattern feature corresponding to the speed adjustment of the user about acceleration and deceleration, based on concatenating the output obtained by applying the second input information to the feature extraction neural network of the backbone model and an output obtained by applying information extracted from a radar signal to the feature extraction neural network. The at least one processor may also apply the driving pattern feature, the output obtained by applying the first input information to the first encoder neural network, and the target speed to the second decoder neural network to obtain the speed profile.

In an embodiment, the at least one processor may individually apply the output obtained by applying the first input information to the first encoder neural network to the first decoder neural network and the second decoder neural network. The at least one processor may also individually apply an output obtained by applying the second input information to the second encoder neural network to the first decoder neural network and the second decoder neural network. The at least one processor may further perform cross-modality processing between the first input information and the second input information, based on an output obtained from each of the first decoder neural network and the second decoder neural network to perform the cross-modal alignment of the backbone model.

In an embodiment, the at least one processor may apply a loss obtained based on the speed profile and ground truth of the speed profile to each of neural networks included in the backbone model to update each of the neural networks included in the backbone model, based on the cross-modal alignment of the backbone model, to perform the main learning of the backbone model.

In an embodiment, the at least one processor may identify a control mode applied to the vehicle such that the vehicle maintains the target speed, based on the main learning of the backbone model, and may determine whether to perform online learning about learning of the backbone model after the main learning is performed, based on the identified control mode.

In an embodiment, the at least one processor may apply the speed profile obtained through inference of the backbone model to the vehicle to control the vehicle, when the control mode of the vehicle is a control mode in which a speed of the vehicle follows a target speed section (i.e., a target speed range) including the target speed.

In an embodiment, the at least one processor may perform the online learning of the backbone model, when the control mode of the vehicle is different from a control mode in which a speed of the vehicle follows the target speed and control authority of the vehicle is set to the user.

In an embodiment, the at least one processor may identify an inference neural network which is a neural network for outputting the speed profile from the second decoder neural network. The at least one processor may also apply the target speed of the vehicle, a driving pattern feature of the user after a time point when the main learning of the backbone model is performed, and the output obtained by applying the first input information to the first encoder neural network to the second decoder neural network to obtain the speed profile to perform the online learning of the backbone model.

In an embodiment, the at least one processor may apply a loss obtained based on the speed profile and ground truth of the speed profile to the inference neural network to update the inference neural network in the backbone model and may update the inference neural network to perform the online learning of the backbone model.

According to another embodiment of the present disclosure, an autonomous driving control method may include: identifying first input information including at least one of a characteristic of a road on which a vehicle is located, event information of the road, or any combination thereof and second input information including a characteristic of the vehicle, the characteristic of the vehicle being extracted from a controller area network (CAN) signal of the vehicle; performing cross-modal alignment of a backbone model for outputting a speed profile including at least one speed in which a pattern of speed adjustment of a user is reflected, based on the first input information and the second input information; applying an output obtained by applying the first input information to a first encoder neural network paired with a first decoder neural network of the backbone model, an output obtained by applying the second input information to a feature extraction neural network of the backbone model, and a target speed which is a speed which should be maintained by the vehicle to a second decoder neural network paired with a second encoder neural network of the backbone model; obtaining the speed profile from the second decoder neural network to perform main learning of the backbone model; and performing the main learning of the backbone model.

In an embodiment, performing of the main learning of the backbone model may include: applying the first input information to an embedding layer of the backbone model to obtain an embedding matrix based on (e.g., following) a predetermined embedding dimension and a dimension of a value input to the embedding layer; and applying the embedding matrix and information about a position of each of values included in the embedding matrix to the first encoder neural network.

In an embodiment, performing of the main learning of the backbone model may include: determining a driving pattern feature corresponding to the speed adjustment of the user about acceleration and deceleration, based on concatenating the output obtained by applying the second input information to the feature extraction neural network of the backbone model and an output obtained by applying information extracted from a radar signal to the feature extraction neural network; and applying the driving pattern feature, the output obtained by applying the first input information to the first encoder neural network, and the target speed to the second decoder neural network to obtain the speed profile.

In an embodiment, performing of the cross-modal alignment of the backbone model may include: individually applying the output obtained by applying the first input information to the first encoder neural network to the first decoder neural network and the second decoder neural network; individually applying an output obtained by applying the second input information to the second encoder neural network to the first decoder neural network and the second decoder neural network; and performing cross-modality processing between the first input information and the second input information, based on an output obtained from each of the first decoder neural network and the second decoder neural network, to perform the cross-modal alignment of the backbone model.

In an embodiment, performing of the main learning of the backbone model may include applying a loss obtained based on the speed profile and ground truth of the speed profile to each of neural networks included in the backbone model to update each of the neural networks included in the backbone model, based on the cross-modal alignment of the backbone model, to perform the main learning of the backbone model.

In an embodiment, the autonomous driving control method may further include: identifying a control mode applied to the vehicle such that the vehicle maintains the target speed, based on the main learning of the backbone model; and determining whether to perform online learning of the backbone model after the main learning is performed, based on the identified control mode.

In an embodiment, identifying of the control mode applied to the vehicle may include applying the speed profile obtained through inference of the backbone model to the vehicle to control the vehicle, when the control mode of the vehicle is a control mode in which a speed of the vehicle follows a target speed section (i.e., a target speed range) including the target speed.

In an embodiment, performing of the online learning of the backbone model may include performing the online learning of the backbone model, when the control mode of the vehicle is different from a control mode in which a speed of the vehicle follows the target speed and control authority of the vehicle is set to the user.

In an embodiment, performing of the online learning of the backbone model may include: identifying an inference neural network which is a neural network for outputting the speed profile from the second decoder neural network; and applying the target speed of the vehicle, a driving pattern feature of the user after a time point when the main learning of the backbone model is performed, and the output obtained by applying the first input information to the first encoder neural network to the second decoder neural network to obtain the speed profile to perform the online learning of the backbone model.

In an embodiment, performing of the online learning of the backbone model may include: applying a loss obtained based on the speed profile and ground truth of the speed profile to the inference neural network to update the inference neural network in the backbone model; and updating the inference neural network to perform the online learning of the backbone network.

BRIEF DESCRIPTION OF THE DRAWINGS

The above and other objects, features and advantages of the present disclosure should be more apparent from the following detailed description taken in conjunction with the accompanying drawings:

FIG. 2 is a flowchart for describing an autonomous driving control method according to an embodiment of the present disclosure;

Figure 1:
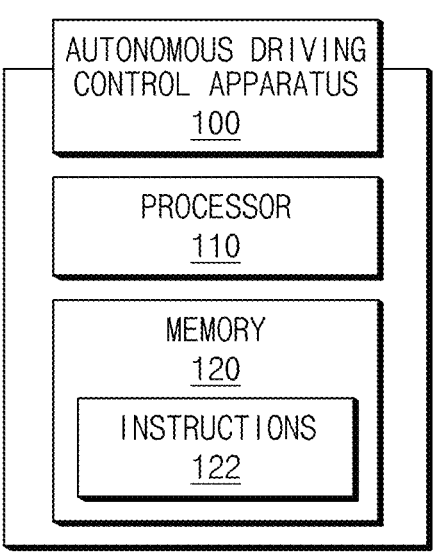
FIG. 1 is a drawing illustrating an autonomous driving control apparatus according to an embodiment of the present disclosure.

With regard to description of drawings, the same or similar denotations may be used for the same or similar components. The drawings described herein are for illustration purposes only and are not intended to limit the scope of the present disclosure in any way.

DETAILED DESCRIPTION

Hereinafter, some embodiments of the present disclosure are described in detail with reference to the drawings. In adding the reference numerals to the components of each drawing, it should be noted that the identical component is designated by the identical numerals even when they are displayed on other drawings. In addition, a detailed description of well-known features or functions has been ruled out in order not to unnecessarily obscure the gist of the present disclosure. Hereinafter, various embodiments of the present disclosure may be described with reference to the accompanying drawings. However, it should be understood that this is not intended to limit the present disclosure to specific implementation forms and includes various modifications, equivalents, and/or alternatives of embodiments of the present disclosure. With regard to description of drawings, similar components may be marked by similar reference numerals.

In describing components of embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application. For example, the terms, such as "first", "second", "1st", "2nd", or the like used in the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In the present disclosure, the expressions "have", "may have", "include" and "comprise", or "may include" and "may comprise" indicate existence of corresponding features (e.g., components such as numeric values, functions, operations, or parts), but do not exclude presence of additional features.

It should be understood that when a component (e.g., a component) is referred to as being "(operatively or communicatively) coupled with/to" or "connected to" another component (e.g., a second component), it can be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the present disclosure may be used exchangeably with, for example, the expression "suitable for", "having the capacity to", "designed to", "adapted to", "made to", or "capable of".

The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor an embedded processor) for performing a corresponding operation or a memory device. Terms used in the disclosure are used to describe specified embodiments and are not intended to limit the scope of another embodiment. The terms of a singular form may include plural forms unless the context clearly indicates otherwise. All the terms used herein, which include technical or scientific terms, may have the same meaning that is generally understood by a person having ordinary skill in the art described in the present disclosure. It should be further understood that terms, which are defined in a dictionary and commonly used, should also be interpreted as is customary in the relevant related art and not in an idealized or overly formal detect unless expressly so defined herein in various embodiments of the present disclosure. In some cases, even though terms are terms which are defined in the specification, they may not be interpreted to exclude embodiments of the present disclosure.

In the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. Particularly, the phrase such as "at least one of A, B, or C, or any combination thereof" may include "A", "B", or "C", or "AB" or "ABC", which is a combination thereof.

When a component, controller, device, element, apparatus, or the like of the present disclosure is described as having a purpose or performing an operation, function, or the like, the component, controller, device, element, apparatus, or the like should be considered herein as being "configured to" meet that purpose or to perform that operation or function.

The term "unit" or "module" used in this specification signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

Hereinafter, embodiments of the present disclosure are described in detail with reference to FIGS. 1 to 10.

FIG. 1 is a drawing illustrating an autonomous driving control apparatus according to an embodiment of the present disclosure.

An autonomous driving control apparatus 100 according to an embodiment may include a processor 110 and a memory 120 including instructions 122. An autonomous driving control apparatus 100 may be a device for obtaining a speed profile including a speed in which a personalized acceleration and deceleration pattern (i.e., a pattern of speed adjustment) is reflected. For example, the autonomous driving control apparatus 100 may perform learning of a backbone model (e.g., training on a backbone model) and inference of the backbone model to generate a personalized speed profile. In detail, the learning of the backbone model may include main learning, such as initial learning of the model (e.g., an initial training on the model), and online learning performed after the learning of the model (e.g., after the initial training on the model). For reference, for convenience of description in the specification, the main learning may indicate learning at a time point before the backbone model is embedded in a vehicle. Similarly, the online learning may indicate learning at a time point after the backbone model is embedded in the vehicle, after the main learning of the backbone model.

Before the main learning of the backbone model, the autonomous driving control apparatus 100 may perform cross-modal alignment of the backbone model. Illustratively, the autonomous driving control apparatus 100 may reduce a deviation between distributions of pieces of input information, through cross-modality processing between input information about a road and input information about the vehicle. Furthermore, the autonomous driving control apparatus 100 may obtain a speed profile from the input information about the road, the input information about the vehicle, and input information about radio detection and ranging (radar).

In an order of performing the cross-modal alignment of the backbone model, performing the main learning, and performing the online learning, the autonomous driving control apparatus 100 may perform the respective operations. In this regard, a detailed description of the backbone model is described below with reference to FIG. 2, the cross-modal alignment and the main learning of the backbone model are described below with reference to FIG. 4, and the online learning and the inference process of the backbone model are described below with reference to FIGS. 5 to 8.

The processor 110 may execute software and may control at least one other component (e.g., a hardware or software component) connected with the processor 110. In addition, the processor 110 may perform a variety of data processing or calculation. For example, the processor 110 may store the input information about the road, the input information about the vehicle, the backbone model, the speed profile, and the like in the memory 120.

For reference, the processor 110 may perform all operations performed by the autonomous driving control apparatus 100. Therefore, for convenience of description in the specification, the operation performed by the autonomous driving control apparatus 100 is mainly described as an operation performed by the processor 110. Furthermore, for convenience of description in the specification, the processor 110 is mainly described as, but not limited to, one processor. For example, the autonomous driving control apparatus 100 may include at least one processor. Each of the at least one processor may perform all operations associated with an operation of obtaining the speed profile.

The memory 120 may temporarily and/or permanently store various pieces of data and/or information required to perform the operation of obtaining the speed profile. For example, the memory 120 may store the input information about the road, the input information about the vehicle, the backbone model, the speed profile, and the like.

The autonomous driving control apparatus 100 may further include a communication device (not shown). For example, the communication device may assist in performing communication between the autonomous driving control apparatus 100 and a server. For example, the communication device may include one or more components for performing communication between the autonomous driving control apparatus 100 and the server. For example, the communication device may include a short range wireless communication unit, a microphone, or the like. A short range communication technology may be, but is not limited to, a wireless LAN (Wi-Fi), Bluetooth, ZigBee, Wi-Fi Direct (WFD), ultra-wideband (UWB), infrared data association (IrDA), Bluetooth low energy (BLE), near field communication (NFC), or the like.

FIG. 2 is a flowchart for describing an autonomous driving control method according to an embodiment of the present disclosure.

In operation 210, an autonomous driving control apparatus (e.g., an autonomous driving control apparatus 100 of FIG. 1) may identify first input information including at least one of a characteristic of a road on which a vehicle is located or event information of the road, or any combination thereof and second input information including a characteristic of the vehicle, which is extracted from a controller area network (CAN) signal of the vehicle. Illustratively, the characteristic of the road may include a curvature of the road and a slope of the road. The event information of the road may include information about a type of the road, information about a speed limit of the road, information about traffic congestion of the road, and information about a speed bump of the road. The CAN signal may include information about a position of the accelerator pedal of the vehicle, information about front wheel motor torque, information about rear wheel motor torque, and information about longitudinal acceleration of the vehicle.

In operation 220, the autonomous driving control apparatus may perform cross-modal alignment of a backbone model for outputting a speed profile including at least one speed in which a pattern of speed adjustment of a user is reflected, based on the first input information and the second input information. Illustratively, the speed profile may be a profile including speeds to be applied to the vehicle during a predetermined time. In detail, the speed profile obtained from the backbone model may include a profile in which speeds in which the pattern of speed adjustment of the user (e.g., a pattern about a normal driving habit or a normal speed adjustment habit of the user, such as an acceleration and deceleration pattern) is reflected are determined at intervals of a predetermined time.

In operation 230, the autonomous driving control apparatus may apply an output obtained by applying the first input information to a first encoder neural network paired with a first decoder neural network of the backbone model, an output obtained by applying the second input information to a feature extraction neural network of the backbone model, and a target speed which is a speed which should be maintained by the vehicle to a second decoder neural network paired with a second encoder neural network of the backbone model.

Illustratively, the backbone model may include the first encoder neural network, the first decoder neural network, the second encoder neural network, the second decoder neural network, and the feature extraction neural network. The first encoder neural network and the first decoder neural network may be in a paired form. Similarly, the second encoder neural network and the second decoder neural network may be in a paired form. To sum up, the autonomous driving control apparatus may apply the first input information to the first encoder neural network to obtain the output. The autonomous driving control apparatus may apply the output of the first encoder neural network, the output obtained by applying the second input information to the feature extraction neural network, and the target speed to the second decoder neural network. Herein, the autonomous driving control apparatus may obtain a speed profile using a combination of the first encoder neural network and the second decoder neural network. This may be a characteristic of the backbone model in which the cross-modal alignment is performed by the autonomous driving control apparatus. The autonomous driving control apparatus may obtain the speed profile, using the combination of the first encoder neural network and the second decoder neural network, rather than the first decoder neural network paired with the first encoder neural network. A detailed description associated with it is given below with reference to FIG. 4.

In operation 240, the autonomous driving control apparatus may obtain the speed profile from the second decoder neural network, thus performing main learning of the backbone model.

The autonomous driving control apparatus may perform learning (e.g., including main learning and online learning) of the backbone model. Illustratively, the backbone model may include a neural network. The neural network may include a plurality of layers. Each layer may include a plurality of nodes. The node may have a node value determined based on an activation function. A node of any layer may be connected with a node (e.g., another node) of another layer through a link (e.g., a connection edge) with a connection weight. The node value of the node may be propagated to other nodes through the link. In an inference operation of the neural network, node values may be forward propagated in the direction of a next layer from a previous layer.

Illustratively, the forward propagation calculation in the backbone model may be calculation of propagating a node value based on input data, in the direction towards the output layer from the input layer of the machine learning model. In other words, a node value of the node may be propagated (e.g., forward propagated) to a node (e.g., a next node) of a next layer connected with the node through the connection edge. For example, the node may receive a value weighted by the connection weight from a previous node (e.g., a plurality of nodes) connected through the connection edge.

The node value of the node may be determined based on applying the activation function to the sum (e.g., weighted sum) of weighted values received from previous nodes. The parameter of the neural network may illustratively include the above-mentioned connection weight. The parameter of the neural network may be updated to change in a direction in which an objective function value, which is described below, is targeted (e.g., a direction in which a loss is minimized).

The trained backbone model may be a model trained by machine learning and may be a trained machine learning model which outputs a training output (e.g., a speed profile) from a training input (e.g., the first input information, the second input information, and the target speed). The machine learning model (e.g. the trained backbone model) may be generated by machine learning. A learning algorithm may include, for example, but is not limited to, supervised learning, unsupervised learning, semi-supervised learning, or reinforcement learning.

The machine learning model may include a plurality of artificial neural network layers. For reference, for convenience of description in the specification, the neural network is described as including at least one layer. An artificial neural network may be, but is not limited to, a combination of at least one of a deep neural network (DNN), a convolutional neural network (CNN), a U-net for image segmentation (U-net), a recurrent neural network (RNN), a restricted Boltzmann machine (RBM), a deep belief network (DBN), a bidirectional recurrent deep neural network (BRDNN), or deep Q-networks, or any combination thereof.

Illustratively, the backbone model may be a transformer model. In detail, the first encoder neural network and the first decoder neural network may, respectively, be an encoder and a decoder of the transformer model. Similarly, the second encoder neural network and the second decoder neural network may, respectively, be an encoder and a decoder of the transformer model. The transformer model may include an encoder-decoder structure using only attention, rather than an RNN structure, thus having a fast learning rate and having better performance than the RNN.

The transformer model may be a model which is implemented with only attention while following the encoder-decoder which is a seq2seq structure. For example, the transformer model may include an encoder-decoder structure which does not use the RNN, but receives an input sequence at an encoder neural network like a seq2seq input and outputs an output sequence at a decoder neural network. Furthermore, the transformer model may include a feature in which there may be N units of the decoder neural network paired with the encoder neural network.

For supervised learning, the above-mentioned machine learning model may be trained based on training data including a pair of a training input and a training output mapped to the training input. For example, the machine learning model may be trained to output a training output from a training input. The machine learning model which is being trained may generate a temporary output in response to the training input and may be trained such that a loss between the temporary output and the training output (e.g., the ground truth which is a training target) is minimized. A parameter of the machine learning model during a learning process (e.g., a connection weight between nodes/layers in the neural network) may be updated according to the loss. Such learning may be performed in the autonomous driving control apparatus itself in which the machine learning model is performed or may be performed by a separate server. The machine learning model, the training of which is performed, (e.g., the trained backbone model) may be stored in a memory (e.g., a memory 120 of FIG. 1).

After operation 240, the autonomous driving control apparatus may apply the speed profile obtained from the trained backbone model to the vehicle, thus controlling the vehicle. A detailed description associated with it is given below with reference to FIG. 5.

Figure 3:
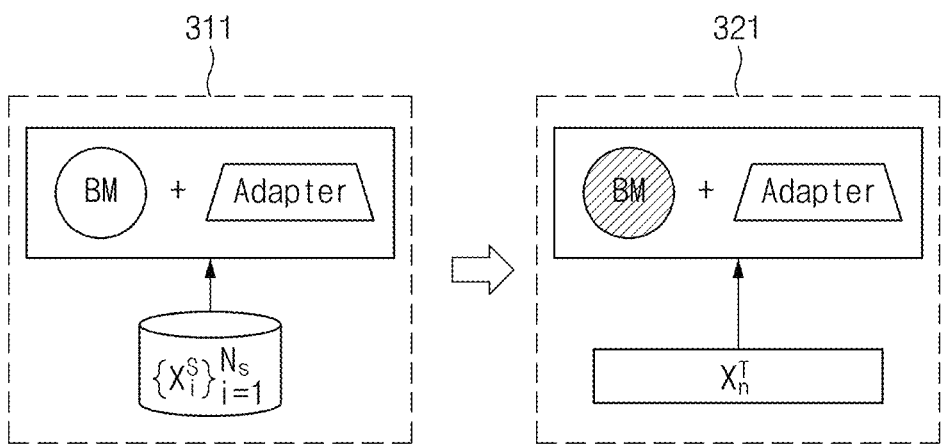
FIG. 3 is a drawing illustrating an order of performing main learning and online learning, in an autonomous driving control apparatus according to an embodiment of the present disclosure.

FIG. 3 is a drawing illustrating an order of performing main learning and online learning, in an autonomous driving control apparatus according to an embodiment of the present disclosure.

An autonomous driving control apparatus (e.g., an autonomous driving control apparatus 100 of FIG. 1) may perform learning of a backbone model. Such learning may include main learning 311 of the backbone model and online learning 321 of the backbone model. Because the difference between the main learning 311 and the online learning 321 is described above with reference to FIG. 1, the description thereof has been omitted in FIG. 3.

Referring to FIG. 3, FIG. 3 illustrates the main learning 311 and the online learning 321. For example, the main learning 311 may precede the online learning 321. In other words, the autonomous driving control apparatus may perform the main learning 311 using a training dataset composed of pieces of driving data of several users, in an offline environment. Thereafter, the autonomous driving control apparatus may perform the online learning 321 using a dataset composed of driving data for one user, in an online environment, thus training the backbone model to suit a characteristic of the user.

The autonomous driving control apparatus may update the backbone model and an adapter, in the process of performing the main learning 311. For example, the adapter may include an inference neural network which is a neural network for outputting a speed profile from a second decoder neural network. Thereafter, the autonomous driving control apparatus may update the adapter, in the process of performing the online learning 321. In other words, the autonomous driving control apparatus may update only the adapter, except for the backbone model, in the process of performing the online learning 321. As a result, the autonomous driving control apparatus may decrease that the backbone model learns only the distribution of training data used in the process of performing the main learning 311 and may additionally train the backbone model using distribution of an actual dataset (i.e., a target dataset) through the process of performing the online learning 321. Furthermore, in the process of performing the online learning 321, the autonomous driving control apparatus may update the inference neural network included in the adapter, thus reducing the time complexity of learning. Hereinafter, a detailed description of the main learning 311 and the online learning 321 is given with reference to FIGS. 4 to 8.

Figure 4:
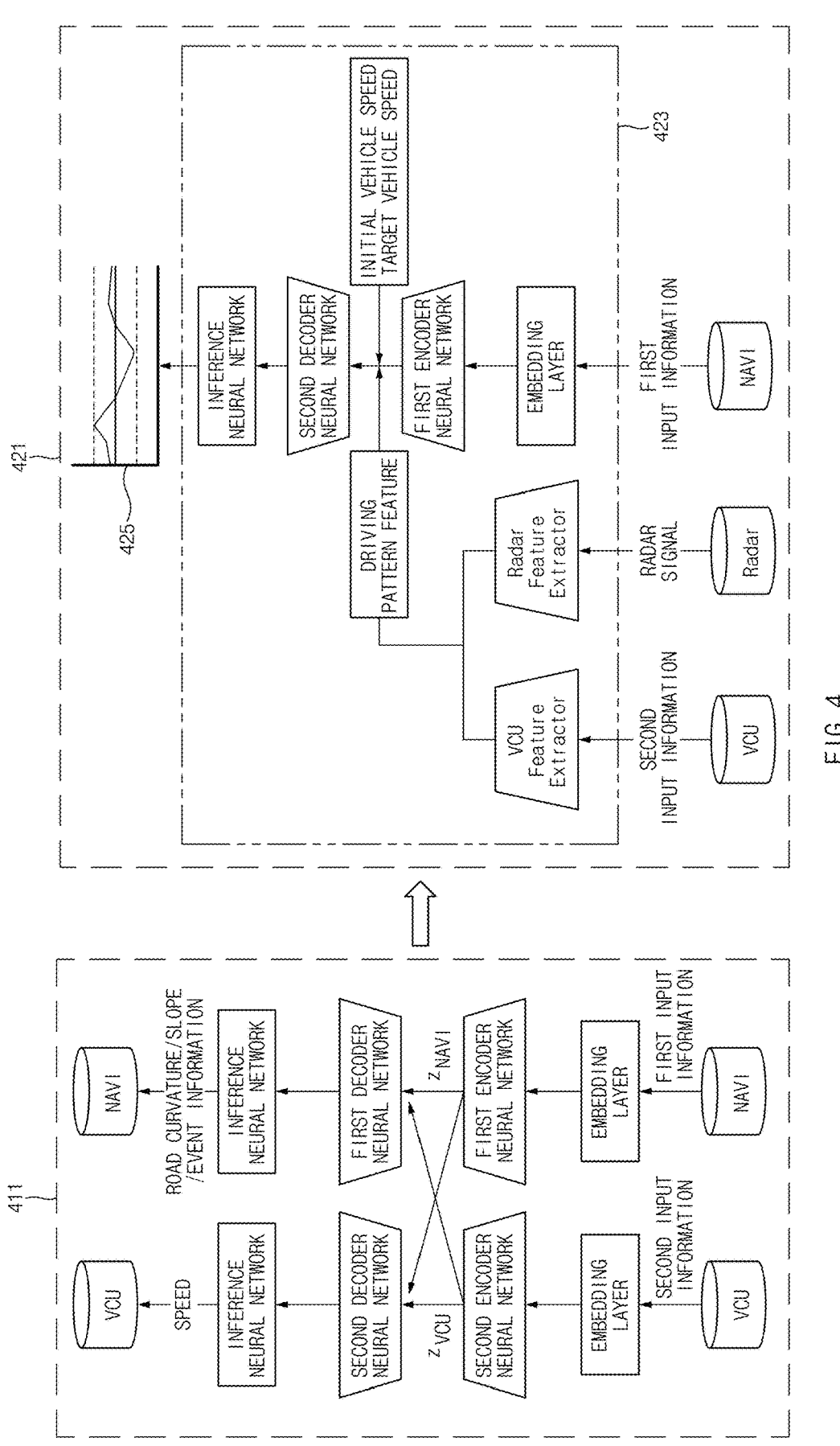
FIG. 4 is a drawing illustrating a method for performing cross-modal alignment and main learning of a backbone model, in an autonomous driving control apparatus according to an embodiment of the present disclosure.

FIG. 4 is a drawing illustrating a method for performing cross-modal alignment and main learning of a backbone model, in an autonomous driving control apparatus according to an embodiment of the present disclosure.

An autonomous driving control apparatus (e.g., an autonomous driving control apparatus 100 of FIG. 1) according to an embodiment may perform cross-modal alignment 411 of a backbone model 423 and main learning 421 of the backbone model 423. In detail, the autonomous driving control apparatus may apply a loss obtained based on a speed profile 425 and the ground truth of the speed profile 425 to each of neural networks (i.e., including an inference neural network) included in the backbone model 423 to update each of the neural networks included in the backbone model 423, based on that the cross-modal alignment 411 of the backbone model 423 is performed (e.g., based on the cross-modal alignment of the backbone model), to perform the main learning 421 of the backbone model 423. Hereinafter, a description of the cross-modal alignment 411 and the main learning 421 is given. For reference, it is illustrated in FIG. 4 that the backbone model 423 includes an embedding layer, a feature extraction neural network, a first encoder neural network, a second decoder neural network, and an inference neural network, but not limited thereto. For example, the backbone model 423 may include a second encoder neural network and a first decoder neural network. Therefore, the backbone model 423 described in the specification may be described as the same model in each of the cross-modal alignment 411, the main learning 421, online learning, and an inference process.

The autonomous driving control apparatus may perform the cross-modal alignment 411 of the backbone model 423, based on first input information and second input information. For example, the autonomous driving control apparatus may apply the first input information to the first encoder neural network. Herein, the autonomous driving control apparatus may apply the first input information to the embedding layer of the backbone model 423 to obtain an embedding matrix following a predetermined embedding dimension and a dimension of a value input to the embedding layer and may apply the embedding matrix and information (i.e., which is able to indicate positional encoding of the embedding matrix) about a position of each of values included in the embedding matrix to the first encoder neural network. The autonomous driving control apparatus may individually apply an output obtained by applying the first input information to the first encoder neural network to the first decoder neural network and the second decoder neural network.

The autonomous driving control apparatus may apply the second input information to the second encoder neural network. Herein, the autonomous driving control apparatus may apply the second input information to the embedding layer to obtain an embedding matrix following a predetermined embedding dimension and a dimension of a value input to the embedding layer and may apply the embedding matrix and information about a position of each of values included in the embedding matrix to the second encoder neural network. The autonomous driving control apparatus may individually apply an output obtained by applying the second input information to the second encoder neural network to the first decoder neural network and the second decoder neural network.

The autonomous driving control apparatus may perform cross-modality processing between the first input information and the second input information, based on the output obtained from each of the first decoder neural network and the second decoder neural network, thus performing cross-modal alignment of the backbone model 423. The autonomous driving control apparatus may use a loss about Equation 1 below to perform the cross-modal alignment of the backbone model 423.

$$L = L_{VCU} + L_{NAVI} + L_{VCU \to NAVI} + L_{NAVI \to VCU} \qquad \text{[Equation 1]}$$

Herein, L may refer to the mean absolute error (MAE) of the ground truth which is the cross-modal alignment loss and of prediction, $L_{VCU}$ may refer to the MAE of the output (i.e., prediction) obtained from the inference neural network paired with the second decoder neural network to which the data about the second input information is input and the ground truth, $L_{NAVI}$ may refer to the MAE of the output obtained from the inference neural network paired with the first decoder neural network to which the data about the first input information is input and the ground truth, $L_{VCU \to NAVI}$ may refer to the MAE of the output obtained from the inference neural network paired with the first decoder neural network to which the data about the second input information is input and the ground truth, and $L_{NAVI \to VCU}$ may refer to the MAE of the output obtained from the inference neural network paired with the second decoder neural network to which the data about the first input information is input and the ground truth.

For reference, a vehicle control unit (VCU) may be a device for performing a function associated with motor control, regenerative braking control, air conditioning load control, or power control of a vehicle, such as electric load power supply control. The VCU may provide the autonomous driving control apparatus with a CAN signal including information about an accelerator pedal, information about front wheel motor torque, information about rear wheel motor torque, and information about longitudinal acceleration. Navigation (NAVI) may be a vehicle automatic navigation system. The NAVI may provide the autonomous driving control apparatus with a characteristic of a road and event information of the road. Therefore, for convenience of description in the specification, the first input information may be described as information determined from the NAVI and the second input information may be described as information determined from the VCU.

The autonomous driving control apparatus may perform the main learning 421 of the backbone model 423, based on performing the cross-modal alignment 411 of the backbone model 423. For example, the autonomous driving control apparatus may apply the first input information to the embedding layer of the backbone model 423 to obtain an embedding matrix following the predetermined embedding dimension and the dimension of the value input to the embedding layer and may apply the embedding matrix and the information about the position of each of the values included in the embedding matrix to the first encoder neural network.

The autonomous driving control apparatus may determine a driving pattern feature corresponding to speed adjustment of a user about acceleration and deceleration, based on concatenating an output obtained by applying the second input information to the feature extraction neural network of the backbone model 423 and an output obtained by applying information extracted from a radar signal to the feature extraction neural network. Herein, the driving pattern feature may include, but is not limited to, data in which pieces of data (e.g., vectors) obtained from each feature extraction neural network are concatenated with each other. The driving pattern feature may be determined by various logic combinations of pieces of data obtained from each feature extraction neural network.

The autonomous driving control apparatus may apply the driving pattern feature, the output obtained by applying first input information to the first encoder neural network, and a target speed to the second decoder neural network to obtain the speed profile 425. In other words, the autonomous driving control apparatus may use the first encoder neural network and the second decoder neural network (i.e., excluding the second encoder neural network and the first decoder neural network), which learn modality between the first input information and the second input information by the cross-modal alignment 411, in the main learning 421. Furthermore, the autonomous driving control apparatus may use the driving pattern feature to increase a learning convergence rate of the backbone model 423 and prevent an error in learning.

The autonomous driving control apparatus may determine an MAE of an output obtained from the inference neural network paired with the second decoder neural network and the ground truth as a loss, in the main learning 421. The autonomous driving control apparatus may update the first encoder neural network, the second decoder neural network, the inference neural network, and the feature extraction neural network included in the backbone model 423, based on the above-mentioned loss.

Figure 5:
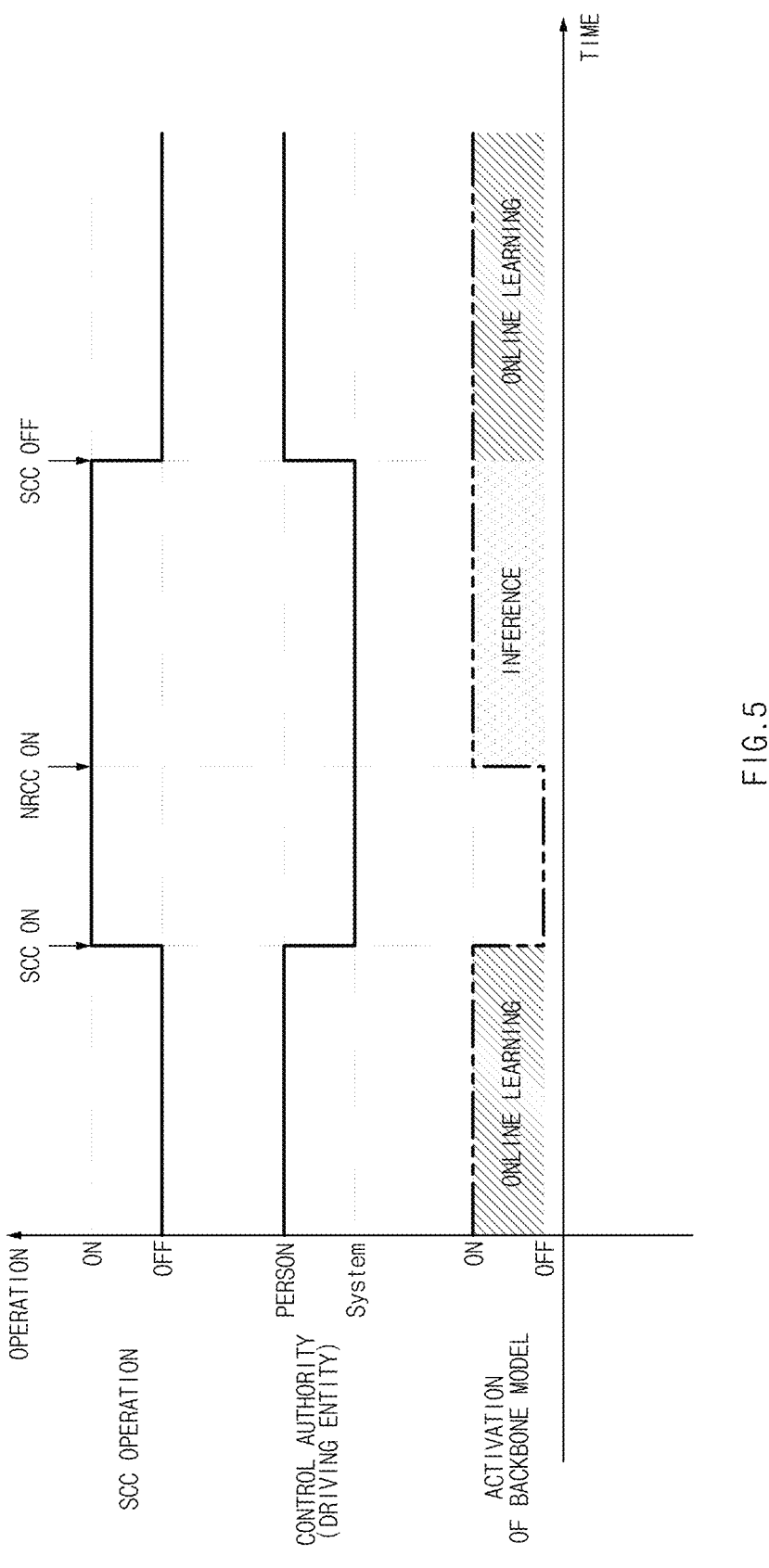
FIG. 5 is a drawing illustrating a time point to perform online learning and inference of a backbone model after main learning, in an autonomous driving control apparatus according to an embodiment of the present disclosure.

FIG. 5 is a drawing illustrating a time point to perform online learning and inference of a backbone model after main learning, in an autonomous driving control apparatus according to an embodiment of the present disclosure.

Referring to FIG. 5, FIG. 5 illustrates a graph for describing a time point to perform online learning of a backbone model and inference of the backbone model, after main learning of the backbone model is performed. The autonomous driving control apparatus may identify a control mode applied to a vehicle such that the vehicle maintains a target speed, based on that the main learning of the backbone model is performed (e.g., based on the main learning of the backbone model). The control mode may include a smart cruise control (SCC) control mode which is a control mode in which the speed of the vehicle follows the target speed and a neural cruise control (NRCC) control mode which is a control mode in which the speed of the vehicle follows a target speed section including the target speed. The autonomous driving control apparatus may determine whether to perform online learning about learning of the backbone model after the main learning is performed, based on the identified control mode.

Referring to FIG. 5, the autonomous driving control apparatus may perform online learning of the backbone model, based on that the control mode of the vehicle is a control mode different from the SCC control mode which is the control mode in which the speed of the vehicle follows the target speed and that the control authority of the vehicle is set to the user (e.g., when the control mode of the vehicle is a control mode different from the SCC control mode in which the speed of the vehicle follows the target speed and the control authority of the vehicle is set to the user).

When the control mode of the vehicle is the SCC control mode which is the control mode in which the speed of the vehicle follows the target speed and the control authority of the vehicle is not set to the user, the autonomous driving control apparatus may stop performing the online learning of the backbone model. Thereafter, the autonomous driving control apparatus may apply a speed profile obtained through inference of the backbone model (e.g., the speed profile obtained through inference operation performed or conducted by the backbone model) to the vehicle to control the vehicle, based on that the control mode of the vehicle is the NRCC control mode which is the control mode in which the speed of the vehicle follows the target speed section (i.e., target speed range) including the target speed (e.g., when the control mode of the vehicle is the NRCC control mode which is the control mode in which the speed of the vehicle follows the target speed section including the target speed).

While performing the inference of the backbone model, when the SCC control mode which is the control mode in which the speed of the vehicle follows the target speed is deactivated, the autonomous driving control apparatus may perform online learning of the backbone model again.

Figure 6:
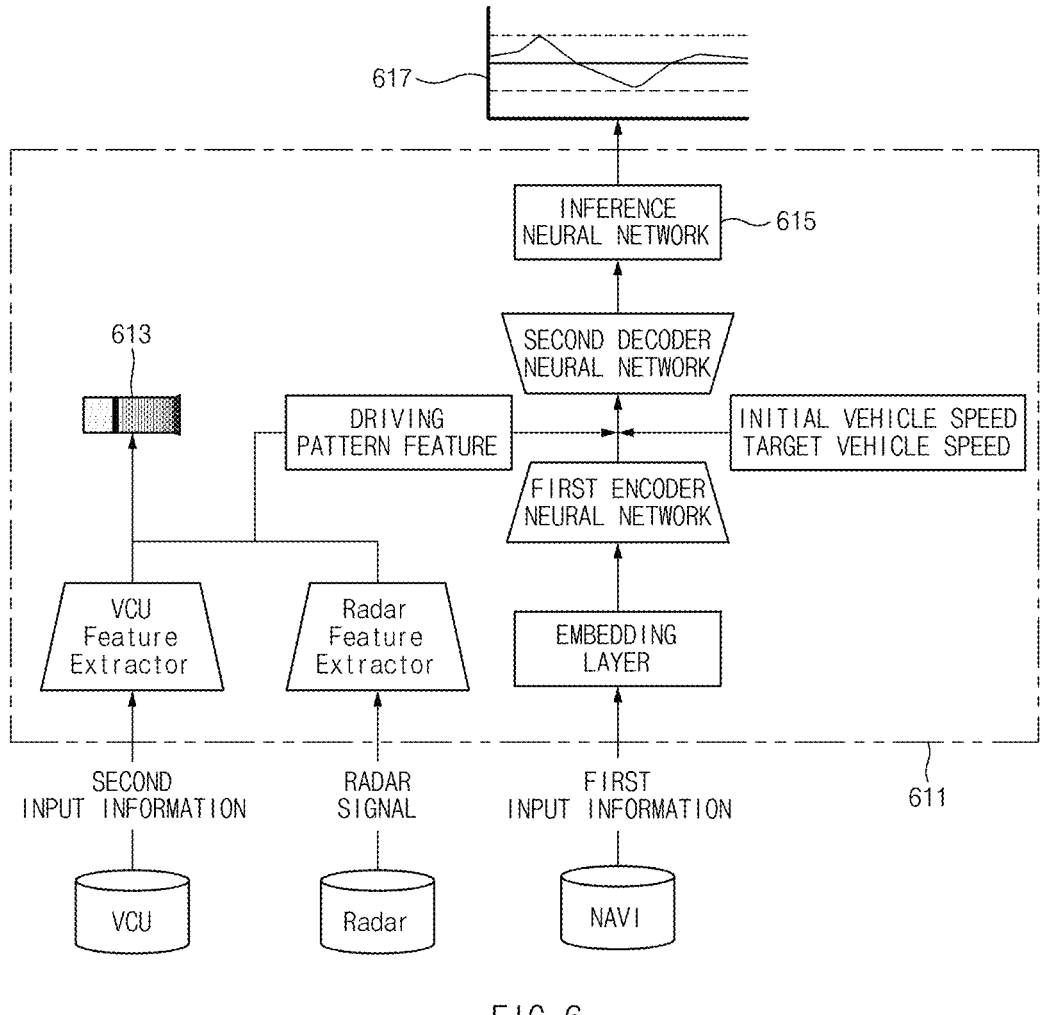
FIG. 6 is a drawing illustrating a method for performing online learning of a backbone model, in an autonomous driving control apparatus according to an embodiment of the present disclosure.

FIG. 6 is a drawing illustrating a method for performing online learning of a backbone model, in an autonomous driving control apparatus according to an embodiment of the present disclosure.

An autonomous driving control apparatus (e.g., an autonomous driving control apparatus 100 of FIG. 1) according to an embodiment may identify an inference neural network 615 which is a neural network for outputting a speed profile 617 from a second decoder neural network. The autonomous driving control apparatus may apply a target speed of a vehicle, a driving pattern feature of a user after a time point when main learning of the backbone model is performed, and an output obtained by applying first input information to a first encoder neural network to the second decoder neural network to obtain the speed profile 617, thus performing online learning of the backbone model.

In detail, the autonomous driving control apparatus may apply a loss obtained based on the speed profile 617 and the ground truth of the speed profile 617 to an inference neural network 615 to update the inference neural network 615 in the backbone model. The autonomous driving control apparatus may update the inference neural network 615 to perform online learning of the backbone model.

In conjunction with the online learning, the autonomous driving control apparatus may generate a dynamic queue 613. For example, the dynamic queue 613 may be generated to continuously output a driving pattern feature, without second input information capable of being obtained from a VCU signal, in an inference situation of the backbone model. The autonomous driving control apparatus may store and update the second input information in the dynamic queue 613, in the online learning process of the backbone model, and fetch the second input information to the driving pattern feature depending on a condition upon inference. In detail, the autonomous driving control apparatus may store and update the second input information in the dynamic queue 613, based on a similarity between the second input information and the information stored in the dynamic queue 613.

Figure 7:
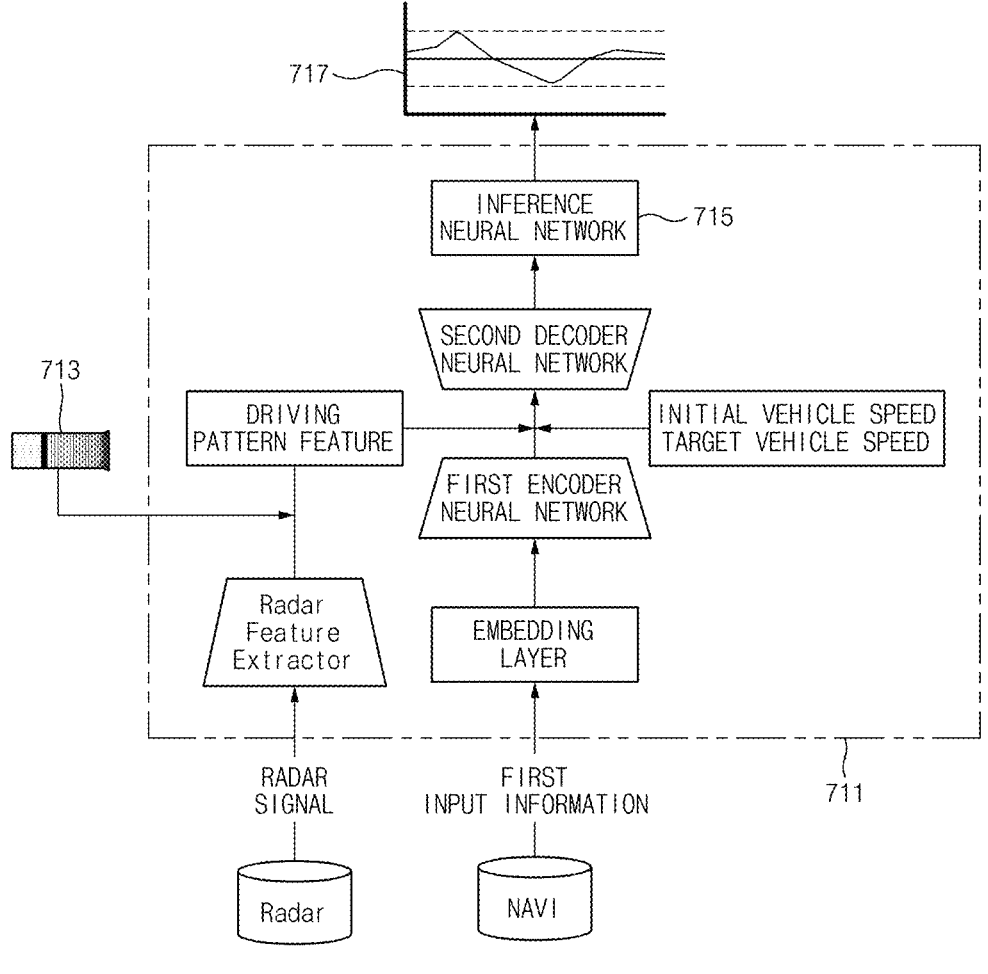
FIG. 7 is a drawing illustrating an inference operation of a backbone model, in an autonomous driving control apparatus according to an embodiment of the present disclosure.

FIG. 7 is a drawing illustrating an inference operation of a backbone model, in an autonomous driving control apparatus according to an embodiment of the present disclosure.

An autonomous driving control apparatus (e.g., an autonomous driving control apparatus 100 of FIG. 1) according to an embodiment may apply a speed profile 717 obtained through inference of a backbone model 711 to a vehicle to control the vehicle (through inference operation performed or conducted by a backbone model 711), based on that a control mode of the vehicle is a control mode in which a speed of vehicle follows a target speed section (a target speed range) including a target speed (e.g., when the control mode of the vehicle is a control mode in which a speed of vehicle follows a target speed range including a target speed).

The autonomous driving control apparatus may apply first input information to an embedding layer of the backbone model 711 to obtain an embedding matrix following a predetermined embedding dimension and a dimension of a value input to the embedding layer. The autonomous driving control apparatus may apply the embedding matrix and information about a position of each of values included in the embedding matrix to a first encoder neural network.

The autonomous driving control apparatus may apply information extracted from a radar signal to a feature extraction neural network of the backbone model 711 to obtain an output. The autonomous driving control apparatus may perform fetching of second input information stored in a dynamic queue 713 to the output obtained from the feature extraction neural network (i.e., an output associated with the radar signal). The autonomous driving control apparatus may perform the fetching, thus outputting a driving pattern feature. To sum up, the autonomous driving control apparatus may output the driving pattern feature through the dynamic queue 713, without the second input information capable of being obtained from a VCU signal, in an inference process of the backbone model 711, thus increasing a speed of the inference.

The autonomous driving control apparatus may apply an output obtained by applying the first input information to the first encoder neural network, the driving pattern feature, and a speed of a vehicle (e.g., including an initial speed and a target speed) to a second decoder neural network. Thereafter, the autonomous driving control apparatus may apply an output obtained from the second decoder neural network to an inference neural network 715 updated in an online learning process to obtain the speed profile 717.

The autonomous driving control apparatus may apply the obtained speed profile 717 to the vehicle to perform control following a target speed section in which the speed of the vehicle follows a target speed in control of the vehicle.

Figure 8:
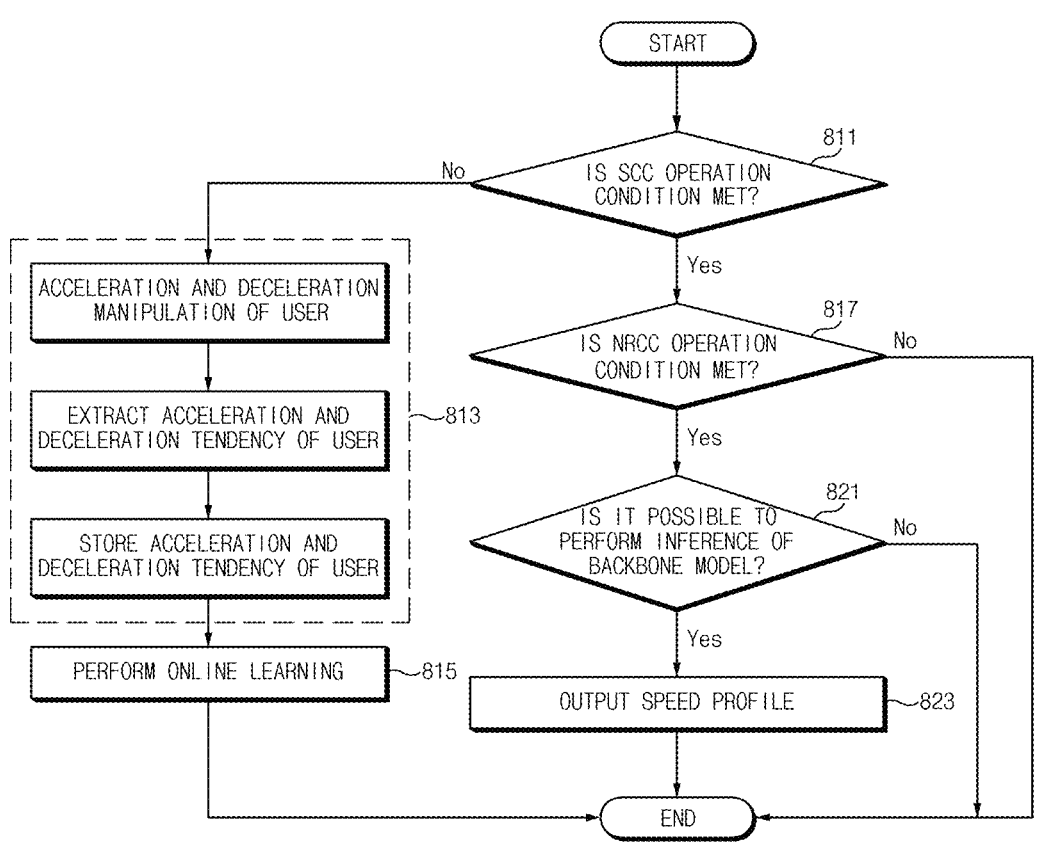
FIG. 8 is a flowchart for describing a method for performing online learning of a backbone model, in an autonomous driving control apparatus according to an embodiment of the present disclosure.

FIG. 8 is a flowchart for describing a method for performing online learning of a backbone model, in an autonomous driving control apparatus according to an embodiment of the present disclosure.

In operation 811, an autonomous driving control apparatus (e.g., an autonomous driving control apparatus 100 of FIG. 1) according to an embodiment may determine whether an SCC operation condition is met. For example, the autonomous driving control apparatus may determine whether the SCC operation condition is met, based on whether control authority of a vehicle is set to a user and whether an SCC operation is performed.

In operation 813, the autonomous driving control apparatus may obtain data for performing online learning, based on that the SCC operation condition is not met. Illustratively, when there is acceleration and deceleration manipulation of the user, the autonomous driving control apparatus may extract and store the acceleration and deceleration manipulation of the user. For reference, the acceleration and deceleration manipulation of the user may be associated with a pattern of speed adjustment of the user.

In operation 815, the autonomous driving control apparatus may perform online learning of a backbone model. In other words, the autonomous driving control apparatus may perform online learning of the backbone model by manipulating the acceleration and deceleration of the user, based on that the control mode of the vehicle is a control mode different from an SCC control mode which is a control mode in which the speed of the vehicle follows a target speed and that the control authority of the vehicle is set to the user (e.g., when the control mode of the vehicle is a control mode different from an SCC control mode in which the speed of the vehicle follows a target speed and the control authority of the vehicle is set to the user).

In operation 817, the autonomous driving control apparatus may determine whether an NRCC operation condition is met, based on that the SCC operation condition is met. For example, when meeting a condition in which the cruise switch is activated, the front radar and navigation are in a normal operation state, the manual lever is in a forward stage (D) state, the road is a highway or an expressway, the current driving speed is greater than or equal to 30 kph and is less than or equal to 160 kph, the current road slope is within a +/−15% range, the current speed of the vehicle is within +/−10 kph range compared to a cruise setting speed (e.g., a target speed), and the brake oil pressure is less than or equal to 0.2 bar, the autonomous driving control apparatus may determine that the NRCC operation condition is met.

In operation 821, the autonomous driving control apparatus may determine whether it is possible to perform inference of a backbone model, based on that the NRCC operation condition is met. Herein, the autonomous driving control apparatus may determine whether it is possible to perform the inference of the backbone model, depending on whether main learning of the backbone model is performed and whether it is able to identify the backbone model.

In operation 823, the autonomous driving control apparatus may output a speed profile, based on that it is possible to perform the inference of the backbone model. Illustratively, the autonomous driving control apparatus may apply an output obtained by applying the first input information to the first encoder neural network, a driving pattern feature, and a speed of a vehicle (e.g., including an initial speed and a target speed) to the second decoder neural network. Thereafter, the autonomous driving control apparatus may apply an output obtained from the second decoder neural network to an inference neural network updated in an online learning process to obtain the speed profile. The autonomous driving control apparatus may apply the obtained speed profile to the vehicle to control the vehicle.

Figure 9:
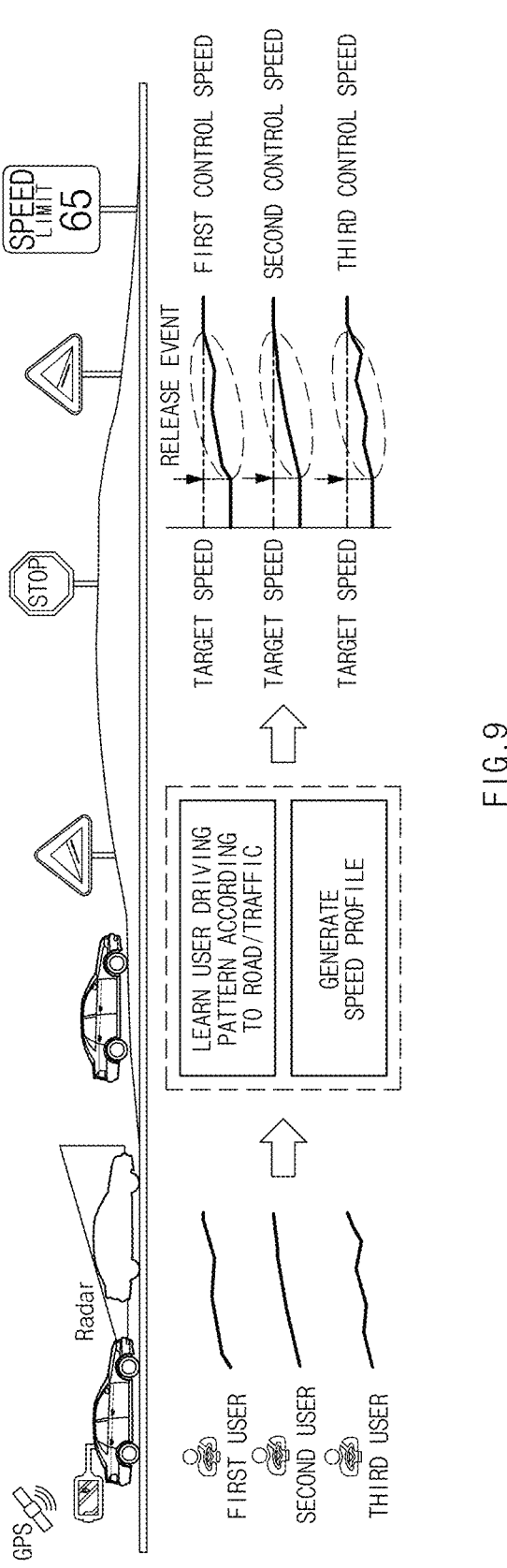
FIG. 9 is a drawing illustrating generating a speed profile for each user, in an autonomous driving control apparatus according to an embodiment of the present disclosure.

FIG. 9 is a drawing illustrating generating a speed profile for each user, in an autonomous driving control apparatus according to an embodiment of the present disclosure.

Referring to FIG. 9, FIG. 9 illustrates generating a speed profile for each user in an autonomous driving control apparatus (e.g., an autonomous driving control apparatus 100 of FIG. 1) according to an embodiment. For example, in an example of first to third users, the autonomous driving control apparatus may learn a driving pattern according to a road and traffic for each user. In other words, the autonomous driving control apparatus may apply the driving pattern for each user to online learning of a backbone model. Thereafter, the autonomous driving control apparatus may output a speed profile for each user, by using the backbone model which learns the driving pattern for each user.

It is possible for such an autonomous driving control apparatus to implement speed control of intelligent cruise control in which driving habits for each individual are inflected, by using the backbone model. Furthermore, the autonomous driving control apparatus may extract a driving pattern feature from the second input information by using a dynamic queue in an inference process. Such a feature of the backbone model may include a feature capable of being embedded in an embedded control system, due to a fast inference speed and a neural network with a small number of parameters.

Figure 10:
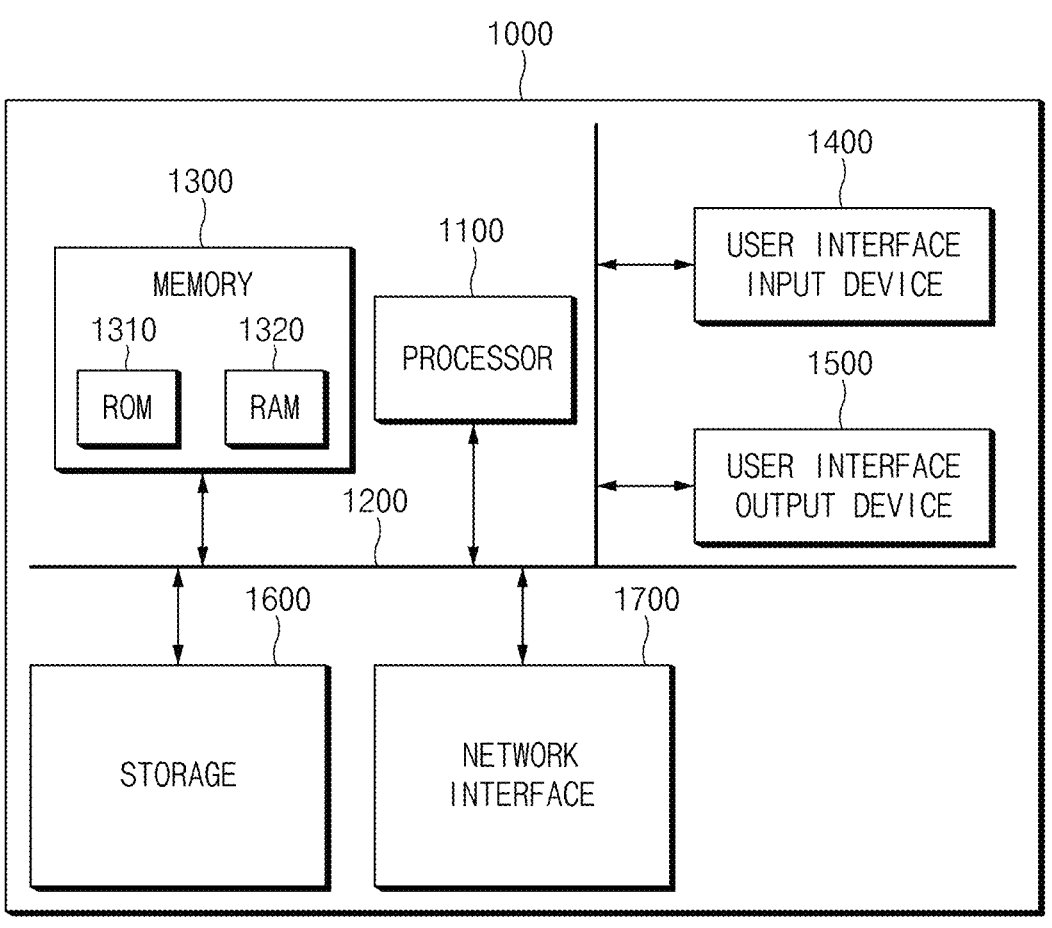
FIG. 10 illustrates a computing system for an autonomous driving control apparatus or an autonomous driving control method according to an embodiment of the present disclosure.

FIG. 10 illustrates a computing system about an autonomous driving control apparatus or an autonomous driving control method according to an embodiment of the present disclosure.

Referring to FIG. 10, a computing system 1000 about the autonomous driving control apparatus or the autonomous driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

The above-described embodiments may be implemented with hardware components, software components, and/or a combination of hardware components and software components. For example, the devices, methods, and components described in the embodiments may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Further, the processing unit may access, store, manipulate, process and generate data in response to execution of software. It should be understood by those having ordinary skill in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to embodiments may be implemented in the form of program instructions which may be executed through various computer means and may be recorded in computer-readable media. The computer-readable media may include program instructions, data files, data structures, and the like alone or in combination, and the program instructions recorded on the media may be specially designed and configured for an example or may be known and usable to those having ordinary skill in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

The above-described hardware devices may be configured to act as one or a plurality of software modules to perform the operations of the embodiments, or vice versa.

Even though the embodiments are described with reference to restricted drawings, it should be apparent to one having ordinary skill in the art that the embodiments are variously changed or modified based on the above description. For example, adequate effects may be achieved even if the foregoing processes and methods are carried out in different order than described above, and/or the aforementioned components, such as systems, structures, devices, or circuits, are combined or coupled in different forms and modes than as described above or be substituted or switched with other components or equivalents.

A description of effects of the autonomous driving control apparatus and method according to an embodiment of the present disclosure is provided.

According to at least one of embodiments of the present disclosure, the autonomous driving control apparatus and method may perform cross-modal alignment of a backbone model including an encoder neural network and a decoder neural network based on first input information which is information about the road and second input information about the vehicle, thus obtaining a speed profile in which a speed adjustment pattern of the user is reflected from the backbone model for reflecting the distribution of the first input information and the distribution of the second input information.

Furthermore, according to at least one of embodiments of the present disclosure, the autonomous driving control apparatus and method may use only a first encoder neural network and a second decoder neural network in an operation of inferring the speed profile, thus reducing time complexity of the calculation process.

Furthermore, according to at least one of embodiments of the present disclosure, the autonomous driving control apparatus and method may use a fast inference speed and a neural network with a smaller number of parameters based on the first encoder neural network and the second decoder neural network to perform embedding in an embedded control system and may additionally perform online learning on a device in which the backbone model is embedded to generate a personalized speed profile.

In addition, various effects ascertained directly or indirectly through the present disclosure may be provided.

Therefore, other implements, other embodiments, and equivalents to claims are within the scope of the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An autonomous driving control apparatus comprising:
a memory storing computer-executable instructions; and
at least one processor configured to access the memory and execute the computer-executable instructions,
wherein the at least one processor is configured to:
identify first input information including:
at least one of a characteristic of a road on which a vehicle is located, event information of the road, or any combination thereof, and
second input information including a characteristic of the vehicle, the characteristic of the vehicle being extracted from a controller area network (CAN) signal of the vehicle;

perform cross-modal alignment of a backbone model for outputting a speed profile including at least one speed in which a pattern of speed adjustment of a user is reflected, based on the first input information and the second input information;

apply an output obtained by applying the first input information to a first encoder neural network paired with a first decoder neural network of the backbone model, an output obtained by applying the second input information to a feature extraction neural network of the backbone model, and a target speed to a second decoder neural network paired with a second encoder neural network of the backbone model, wherein the target speed is a speed to be maintained by the vehicle; and obtain the speed profile from the second decoder neural network to perform main learning of the backbone model.

2. The autonomous driving control apparatus of claim 1, wherein the at least one processor is configured to:

apply the first input information to an embedding layer of the backbone model to obtain an embedding matrix based on a predetermined embedding dimension and a dimension of a value input to the embedding layer; and apply the embedding matrix and information about a position of each of values included in the embedding matrix to the first encoder neural network.

3. The autonomous driving control apparatus of claim 1, wherein the at least one processor is configured to:

determine a driving pattern feature corresponding to the speed adjustment of the user about acceleration and deceleration, based on concatenating the output obtained by applying the second input information to the feature extraction neural network of the backbone model and an output obtained by applying information extracted from a radar signal to the feature extraction neural network; and apply the driving pattern feature, the output obtained by applying the first input information to the first encoder neural network, and the target speed to the second decoder neural network to obtain the speed profile.

4. The autonomous driving control apparatus of claim 1, wherein the at least one processor is configured to:

individually apply the output obtained by applying the first input information to the first encoder neural network to the first decoder neural network and the second decoder neural network;

individually apply an output obtained by applying the second input information to the second encoder neural network to the first decoder neural network and the second decoder neural network; and perform cross-modality processing between the first input information and the second input information, based on an output obtained from each of the first decoder neural network and the second decoder neural network to perform the cross-modal alignment of the backbone model.

5. The autonomous driving control apparatus of claim 4, wherein the at least one processor is configured to:

apply a loss obtained based on the speed profile and ground truth of the speed profile to each of neural networks included in the backbone model to update each of the neural networks included in the backbone model, based on the cross-modal alignment of the backbone model, to perform the main learning of the backbone model.

6. The autonomous driving control apparatus of claim 1, wherein the at least one processor is configured to:

identify, based on the main learning of the backbone model, a control mode applied to the vehicle such that the vehicle maintains the target speed; and determine, based on the identified control mode, whether to perform online learning about learning of the backbone model after the main learning is performed.

7. The autonomous driving control apparatus of claim 6, wherein the at least one processor is configured to:

apply the speed profile obtained through inference of the backbone model to the vehicle to control the vehicle, when the control mode of the vehicle is a control mode in which a speed of the vehicle follows a target speed range including the target speed.

8. The autonomous driving control apparatus of claim 6, wherein the at least one processor is configured to:

perform the online learning of the backbone model, when the control mode of the vehicle is different from a control mode in which a speed of the vehicle follows the target speed and control authority of the vehicle is set to the user.

9. The autonomous driving control apparatus of claim 8, wherein the at least one processor is configured to:

identify an inference neural network for outputting the speed profile from the second decoder neural network; and apply the target speed of the vehicle, a driving pattern feature of the user after a time point when the main learning of the backbone model is performed, and the output obtained by applying the first input information to the first encoder neural network to the second decoder neural network to obtain the speed profile to perform the online learning of the backbone model.

10. The autonomous driving control apparatus of claim 9, wherein the at least one processor is configured to:

apply a loss obtained based on the speed profile and ground truth of the speed profile to the inference neural network to update the inference neural network in the backbone model; and update the inference neural network to perform the online learning of the backbone model.

11. An autonomous driving control method, comprising:

identifying first input information including at least one of a characteristic of a road on which a vehicle is located, event information of the road, or any combination thereof and second input information including a characteristic of the vehicle, the characteristic of the vehicle being extracted from a controller area network (CAN) signal of the vehicle;

performing cross-modal alignment of a backbone model for outputting a speed profile including at least one speed in which a pattern of speed adjustment of a user is reflected, based on the first input information and the second input information;

applying an output obtained by applying the first input information to a first encoder neural network paired with a first decoder neural network of the backbone model, an output obtained by applying the second input information to a feature extraction neural network of the backbone model, and a target speed to a second decoder neural network paired with a second encoder neural network of the backbone model, wherein the target speed is a speed to be maintained by the vehicle;

obtaining the speed profile from the second decoder neural network to perform main learning of the backbone model; and performing the main learning of the backbone model.

12. The autonomous driving control method of claim 11, wherein performing of the main learning of the backbone model includes:

applying the first input information to an embedding layer of the backbone model to obtain an embedding matrix based on a predetermined embedding dimension and a dimension of a value input to the embedding layer; and applying the embedding matrix and information about a position of each of values included in the embedding matrix to the first encoder neural network.

13. The autonomous driving control method of claim 11, wherein performing of the main learning of the backbone model includes:

determining a driving pattern feature corresponding to the speed adjustment of the user about acceleration and deceleration, based on concatenating the output obtained by applying the second input information to the feature extraction neural network of the backbone model and an output obtained by applying information extracted from a radar signal to the feature extraction neural network; and applying the driving pattern feature, the output obtained by applying the first input information to the first encoder neural network, and the target speed to the second decoder neural network to obtain the speed profile.

14. The autonomous driving control method of claim 11, wherein performing of the cross-modal alignment of the backbone model includes:

individually applying the output obtained by applying the first input information to the first encoder neural network to the first decoder neural network and the second decoder neural network;

individually applying an output obtained by applying the second input information to the second encoder neural network to the first decoder neural network and the second decoder neural network; and performing cross-modality processing between the first input information and the second input information, based on an output obtained from each of the first decoder neural network and the second decoder neural network, to perform the cross-modal alignment of the backbone model.

15. The autonomous driving control method of claim 14, wherein performing of the main learning of the backbone model includes:

applying a loss obtained based on the speed profile and ground truth of the speed profile to each of neural networks included in the backbone model to update each of the neural networks included in the backbone model, based on the cross-modal alignment of the backbone model, to perform the main learning of the backbone model.

16. The autonomous driving control method of claim 11, further comprising:

identifying, based on the main learning of the backbone model, a control mode applied to the vehicle such that the vehicle maintains the target speed; and determining, based on the identified control mode, whether to perform online learning of the backbone model after the main learning is performed.

17. The autonomous driving control method of claim 16, wherein identifying of the control mode applied to the vehicle includes:

applying the speed profile obtained through inference of the backbone model to the vehicle to control the vehicle, when the control mode of the vehicle is a control mode in which a speed of the vehicle follows a target speed range including the target speed.

18. The autonomous driving control method of claim 16, wherein performing of the online learning of the backbone model includes:

performing the online learning of the backbone model, when the control mode of the vehicle is different from a control mode in which a speed of the vehicle follows the target speed and control authority of the vehicle is set to the user.

19. The autonomous driving control method of claim 18, wherein performing of the online learning of the backbone model includes:

identifying an inference neural network for outputting the speed profile from the second decoder neural network; and applying the target speed of the vehicle, a driving pattern feature of the user after a time point when the main learning of the backbone model is performed, and the output obtained by applying the first input information to the first encoder neural network to the second decoder neural network to obtain the speed profile to perform the online learning of the backbone model.

20. The autonomous driving control method of claim 19, wherein performing of the online learning of the backbone model includes:

applying a loss obtained based on the speed profile and ground truth of the speed profile to the inference neural network to update the inference neural network in the backbone model; and updating the inference neural network to perform the online learning of the backbone network.

* * * * *